(12) United States Patent
Xia

(10) Patent No.: US 9,360,178 B2
(45) Date of Patent: Jun. 7, 2016

(54) LED LIGHT STRIP, BACKLIGHT MODULE AND DISPLAY DEVICE

(71) Applicants: Boe Technology Group Co., Ltd., Beijing (CN); Boe Optical Science and Technology Co., Ltd., Suzhou (CN)

(72) Inventor: Xiaoli Xia, Beijing (CN)

(73) Assignees: Boe Technology Group Co., Ltd., Beijing (CN); Boe Optical Science and Technology Co., Ltd., Suzhou (CN)

( * ) Notice: Subject to any disclaimer, the term of this patent is extended or adjusted under 35 U.S.C. 154(b) by 46 days.

(21) Appl. No.: 14/500,659

(22) Filed: Sep. 29, 2014

(65) Prior Publication Data

US 2015/0330585 A1    Nov. 19, 2015

(30) Foreign Application Priority Data

May 19, 2014  (CN) .................... 2014 2 0255863 U

(51) Int. Cl.
| | |
|---|---|
| F21V 7/04 | (2006.01) |
| F21S 4/00 | (2016.01) |
| F21K 99/00 | (2016.01) |
| F21V 8/00 | (2006.01) |
| F21Y 101/02 | (2006.01) |

(52) U.S. Cl.
CPC . F21S 4/003 (2013.01); F21K 9/30 (2013.01); G02B 6/0073 (2013.01); F21Y 2101/02 (2013.01)

(58) Field of Classification Search
CPC ........... F21S 4/003; F21S 4/005; F21S 4/006; F21S 4/007; F21S 4/008; F21K 9/30; G02B 6/0073; F21Y 2101/02
USPC .......... 362/217.01, 220, 612, 97.1, 97.2, 97.3
See application file for complete search history.

(56) References Cited

U.S. PATENT DOCUMENTS

| | | | | |
|---|---|---|---|---|
| 2003/0095260 | A1* | 5/2003 | Yoneda | G01N 21/8806 356/446 |
| 2012/0170249 | A1* | 7/2012 | Shan | G02B 6/002 362/97.1 |
| 2012/0199852 | A1* | 8/2012 | Lowes | G09F 9/33 257/88 |
| 2013/0121020 | A1* | 5/2013 | Liu | G02B 6/0068 362/606 |
| 2014/0117386 | A1* | 5/2014 | Rol | H01L 25/0753 257/88 |

* cited by examiner

*Primary Examiner* — Anh Mai
*Assistant Examiner* — Glenn Zimmerman
(74) *Attorney, Agent, or Firm* — Calfee, Halter & Griswold LLP

(57) ABSTRACT

The embodiments of the present invention provide an LED light strip, a backlight module, and a display device. The LED light strip includes a circuit board and further includes a plurality of LED illuminants that are electrically connected to the circuit board. The plurality of LED illuminants are arranged on the upper surface of the circuit board along a first direction, and intervals between the light-emitting centers of any two adjacent LED illuminants are not completely equal. The plurality of LED illuminants include light output surfaces perpendicular to the upper surface, wherein the light output surface of at least one LED illuminant is deflectively set at an acute angle with respect to the first direction or the reverse direction of the first direction.

10 Claims, 6 Drawing Sheets

… … …

LED LIGHT STRIP, BACKLIGHT MODULE AND DISPLAY DEVICE

RELATED APPLICATIONS

The present application claims the benefit of Chinese Patent Application No. 201420255863.9, filed May 19, 2014, the entire disclosure of which is incorporated herein by reference.

FIELD OF THE INVENTION

The present invention relates to the display technical field, in particular to an LED light strip, a backlight module and a display device.

BACKGROUND OF THE INVENTION

At present, the light source widely used in the backlight module is light-emitting diode (LED). The LED light source has the following two outstanding characteristics. First, the LED is a spot illuminant and the intensity of light emitted from its light-emitting center is the strongest, thus the intensity of light emitted from the light output surface tends to gradually decrease from the center to both sides. Second, since the light-emitting range of the LED illuminant is limited, and the light-emitting angle thereof is usually greater than 90° and smaller than 120°, the range of light emitted from the light output surface is similar to a fan shape.

As shown in FIG. 1(a), the LED illuminant 12 will generate a light-emitting range as shown by the arrow directions in the figure. In the prior art, in order to guide light emitted by the LED illuminant 12 into a light guide plate 20 to the greatest extent, while avoiding light loss of the incident light due to the refraction of air in a gap between the LED illuminant 12 and the light input surface 201 of the light guide plate 20, the light input surface 201 of the light guide plate 20 is usually set in direct contact with the light output surface (not shown) of the LED illuminant 12. Due to the inherent limitation of the light-emitting angle of the LED illuminant 12, after light emitted from the LED illuminant 12 enters the light guide plate 20, an area with bright light (i.e. bright spot 01) will be formed in front of the light output surface of the LED illuminant 12, while an area with dark light (i.e. dark spot 02) will be formed between two adjacent LED illuminants. Such alternation of brightness and darkness is called hot spot phenomenon. When the LED illuminants are arranged at equal intervals, such phenomenon of alternation of brightness and darkness is more serious. The hot spot phenomenon would cause the homogeneous brightness to decrease at the edges of a display device, thereby affecting the quality of the display picture.

To solve the problem, the purpose of alleviating the hot spot phenomenon is typically achieved in the prior art by increasing the number of LED illuminants or widening the width of the frame. However, increasing the number of LED illuminants would significantly increase the cost of the backlight light source and result in difficulty in heat dissipation of the LED illuminants, and widening the width of the frame would reduce the effective visible area of the display device and deteriorate the viewing effect. Moreover, frames that are too wide are difficult to meet the requirement of being light and thin on current display devices.

SUMMARY OF THE INVENTION

The embodiments of the present invention provide an LED light strip, a backlight module and a display device, which effectively solve the hot spot phenomenon resulted from limitation of the light-emitting angle of the LED illuminant per se without increasing the number of the LED illuminants.

In order to achieve the above object, the embodiments of the present invention employ the following technical solutions.

In a first aspect, the embodiments of the present invention provide an LED light strip including a circuit board and a plurality of LED illuminants electrically connected to the circuit board. The plurality of LED illuminants are arranged on the upper surface of the circuit board along a first direction, and intervals between the light-emitting centers of an LED illuminant and the two adjacent LED illuminants are not equal. The plurality of LED illuminants include light output surfaces perpendicular to the upper surface, and the light output surface of at least one LED illuminant is deflectively set at an acute angle with respect to the first direction or the reverse direction of the first direction.

In one embodiment, the light output surfaces of the LED illuminants at odd number positions are deflectively set at an acute angle with respect to the first direction, and the light output surfaces of the LED illuminants at even number positions are deflectively set at an acute angle with respect to the reverse direction of the first direction. In another embodiment, the light output surfaces of the LED illuminants at odd number positions are deflectively set at an acute angle with respect to the reverse direction of the first direction, and the light output surfaces of the LED illuminants at even number positions are deflectively set at an acute angle with respect to the first direction.

In one embodiment, the interval between the light-emitting center of an LED illuminant whose light output surface is deflectively set at an acute angle with respect to the first direction and the light-emitting center of an adjacent LED illuminant along the first direction whose light output surface is deflectively set at an acute angle with respect to the reverse direction of the first direction is a first interval $Y_1$. The interval between the light-emitting center of an LED illuminant whose light output surface is deflectively set at an acute angle with respect to the first direction and the light-emitting center of another adjacent LED illuminant along the reverse direction of the first direction whose light output surface is deflectively set at an acute angle with respect to the reverse direction of the first direction is a second interval $Y_2$; wherein the first interval $Y_1$ is greater than the second interval $Y_2$.

In one embodiment, the light-emitting angle of each LED illuminant is $2\alpha$ and the acute angles are all $\beta$, wherein $2\alpha > 90°$, $\beta < \alpha$, and $0° < \beta \le (90° - \alpha)$.

In a second aspect, the embodiments of the present invention provide a backlight module including a light guide plate and an LED light strip located on at least one side of the light guide plate, with the LED light strip being the LED light strip according to any one of the above embodiments. The light guide plate includes a nonplanar light input surface, and the light input surface contacts the light output surfaces of the plurality of LED illuminants.

In one embodiment, the light input surface includes a plurality of protrusions having two slopes set oppositely; wherein the slope contacts the light output surfaces of the plurality of LED illuminants. A center-to-center interval between two slopes set oppositely in any protrusion is greater than a center-to-center interval between two slopes close to each other in adjacent protrusions.

In one embodiment, the interval between the light-emitting center of an LED illuminant whose light output surface is deflectively set at an acute angle with respect to the first direction and the light-emitting center of an adjacent LED illuminant along the first direction whose light output surface is deflectively set at an acute angle with respect to the reverse direction of the first direction is a first interval $Y_1$. The interval between the light-emitting center of an LED illuminant whose light output surface is deflectively set at an acute angle with respect to the first direction and the light-emitting center of another adjacent LED illuminant along the reverse direction of the first direction whose light output surface is deflectively set at an acute angle with respect to the reverse direction of the first direction is a second interval $Y_2$. The first interval $Y_1$ is greater than the second interval $Y_2$.

In one embodiment, the light guide plate further includes two opposite side faces perpendicular to the light input surface. The light input surface of the light guide plate has a width of L. The number of the plurality of LED illuminants is n, with n being a positive integer greater than or equal to 2. An average interval $X_0$ between the light-emitting centers of two adjacent LED illuminants is L/n, and $Y_1 > X_0 > Y_2$. In the case that n is an odd number, the sum of the intervals from the light-emitting centers of the LED illuminants located at two ends of the circuit board to the extension line directions of closer side faces is $(Y_1+Y_2)/2$. In the case that n is an even number, the sum of the intervals from the light-emitting centers of the LED illuminants located at two ends of the circuit board to the extension line directions of closer side faces is $Y_2$.

In one embodiment, with respect to the light input surface of the light guide plate, two adjacent LED illuminants whose light-emitting centers have an interval of the second interval $Y_2$ contact each other.

In a third aspect, the embodiments of the present invention provide a display device including the LED light strip, or the backlight module.

The embodiments of the present invention provide an LED light strip, a backlight module, and a display device. The LED light strip includes a circuit board and a plurality of LED illuminants electrically connected to the circuit board. The plurality of LED illuminants are arranged on the upper surface of the circuit board along a first direction, and intervals between the light-emitting centers of one of the LED illuminants and the two adjacent LED illuminants are not completely equal. The plurality of LED illuminants include light output surfaces perpendicular to the upper surface; wherein the light output surface of at least one LED illuminant is deflectively set at an acute angle with respect to the first direction or the reverse direction of the first direction.

Compared with the prior art, in the LED light strip provided in the embodiments of the present invention, since intervals between the light-emitting centers of any two adjacent LED illuminants are not completely equal, it is possible to adjust the intervals between the light-emitting centers of the plurality of LED illuminants to alleviate the degree of regular occurrence of bright spot and dark spot (i.e. alleviating the hot spot phenomenon). Meanwhile, since the light output surface of at least one LED illuminant is deflectively set at an acute angle with respect to the first direction or the reverse direction of the first direction, it is possible to adjust the deflection direction and/or deflection amplitude of the light output surfaces of the plurality of LED illuminants having different intervals such that light emitted from the light output surfaces of the plurality of LED illuminants is deflected to reduce or compensate for the blind area (i.e., illumination intensity at dark spot) of light emission between two adjacent LED illuminants in the prior art and further alleviate the hot spot phenomenon, effectively solving the hot spot phenomenon resulted from inherent limitation of the light-emitting angle of the LED illuminant.

BRIEF DESCRIPTION OF THE DRAWINGS

In order to set forth the technical solutions of the embodiments of the present invention more clearly, the embodiments of the present invention will be introduced as follows by reference to the figures. Obviously, the figures described as follows are only some embodiments of the present invention. Those ordinarily skilled in the art can further obtain other embodiments according to these figures without any inventive efforts.

FIG. 1(*b*) is a diagram of optical path analysis of FIG. 1(*a*);

FIG. 6(*b*) is another amplified diagram of a part in FIG. 5;

FIG. 6(*c*) is yet another amplified diagram of a part in FIG. 5;

DETAILED DESCRIPTION OF THE INVENTION

The technical solutions of the embodiments of the present invention will be described clearly and comprehensively as follows in combination with the figures in the embodiments of the present invention. Obviously, the described embodiments are only part of the embodiments of the present invention, rather than all the embodiments. All the other embodiments obtained by those ordinarily skilled in the art based on the embodiments of the present invention without any inventive efforts belong to the protection scope of the present invention.

REFERENCE SIGNS

01—bright spot; 02—dark spot; 10—LED light strip; 11—circuit board; 110—upper surface; 12—LED illuminant; 120—light output surface; 20—light guide plate; 201—light input surface; 2010—protrusion; 2011—slope; 202—side face.

Figure 2:
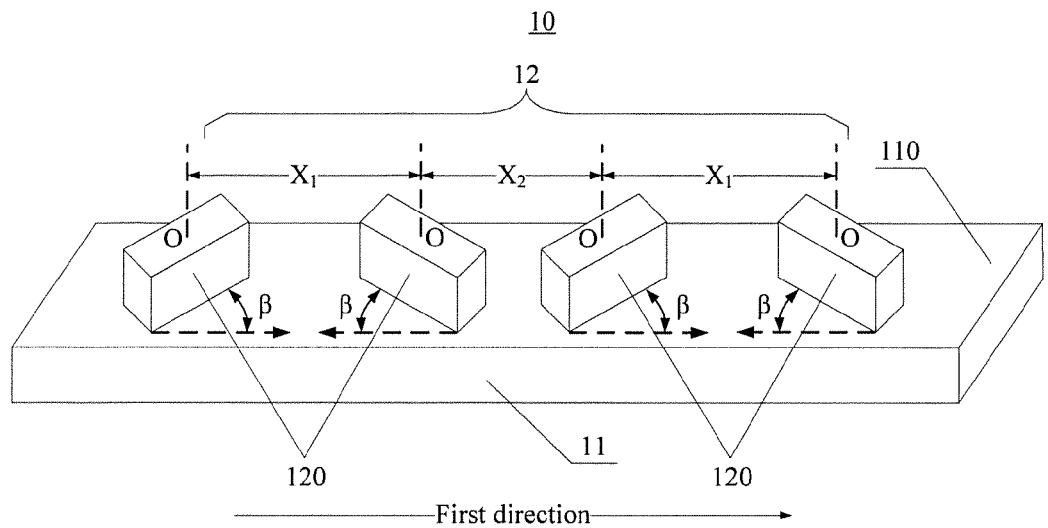
FIG. 2 is a structural diagram of an LED light strip provided in the embodiments of the present invention.
Figure 3:
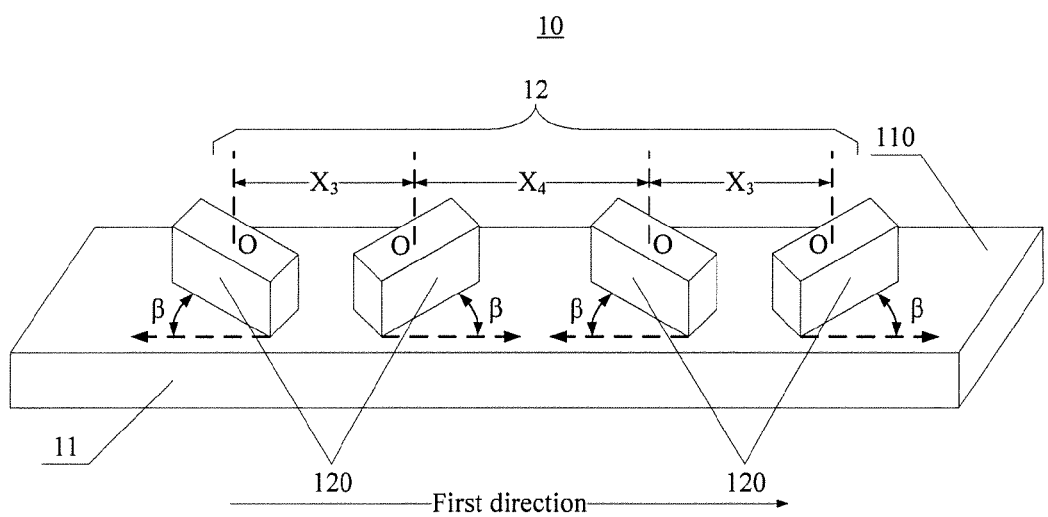
FIG. 3 is a structural diagram of another LED light strip provided in the embodiments of the present invention.

The embodiments of the present invention provide an LED light strip 10. As shown in FIGS. 2 and 3, the LED light strip 10 includes a circuit board 11 and a plurality of LED illuminants 12 electrically connected to the circuit board 11; the plurality of LED illuminants 12 are arranged on the upper surface 110 of the circuit board along a first direction, and intervals between the light-emitting center (indicated as O in the figures) of an LED illuminant 12 and the light-emittings centers O of the two adjacent LED illuminants 12 are not completely equal. The plurality of LED illuminants 12 include light output surfaces 120 perpendicular to the upper surface 110; wherein the light output surface of at least one LED illuminant 12 is deflectively set at an acute angle with respect to the first direction or the reverse direction of the first direction.

It should be noted that, firstly, the circuit board 11 may be, for example, a printed circuit board (PCB) or a flexible printed circuit (FPC). Since FPC has many advantages such as high wiring density, high reliability, small thickness and excellent flexibility, in the embodiments of the present invention, the circuit board 11 may advantageously be a flexible printed circuit (FPC). Secondly, the embodiments of the present invention do not limit the deflection direction and/or deflection amplitude of the LED illuminants 12, as long as they can alleviate the apparent, regular hot spot phenomenon in the LED light strips provided in the prior art and improve illumination intensity in the blind area of light emission.

In the LED light strips provided in the prior art, the light-emitting centers of the LED illuminants are arranged at equal intervals. The hot spot phenomenon is serious since the inherent limitation of the light-emitting angle of the LED illuminant leads to high regularity of bright spots and dark spots.

Compared with the prior art, in the LED light strip 10 provided in the embodiments of the present invention, by providing intervals between the light-emitting center of an LED illuminant and the light-emitting centers of the two adjacent LED illuminants 12 that are not equal, it is possible to adjust the intervals between the light-emitting centers of the plurality of LED illuminants 12 to alleviate the degree of regular occurrence of bright spots and dark spots (i.e. alleviating the hot spot phenomenon). Meanwhile, by deflectively setting the light output surface 120 of at least one LED illuminant 12 at an acute angle with respect to the first direction or the reverse direction of the first direction, it is possible to adjust the deflection direction and/or deflection amplitude of the light output surfaces 120 of the plurality of LED illuminants 12 having different intervals such that light emitted from the light output surfaces 120 of the plurality of LED illuminants 12 is deflected to reduce or compensate for the blind area (i.e. illumination intensity at dark spot) of light emission between two adjacent LED illuminants 12 in the prior art and further alleviate the hot spot phenomenon.

On such basis, the plurality of LED illuminants 12 can be arranged on the upper surface 110 of the circuit board, for example, in the following two manners.

In a first manner, as shown in FIG. 2, the light output surfaces 120 of the LED illuminants 12 at odd number positions are deflectively set at an acute angle with respect to the first direction, and the light output surfaces 120 of the LED illuminants 12 at even number positions are deflectively set at an acute angle with respect to the reverse direction of the first direction.

Here, the deflection angles of the light output surfaces 120 of the LED illuminants 12 at odd number positions with respect to the first direction may be the same or different. Likewise, the light output surfaces 120 of the LED illuminants 12 at even number positions with respect to the reverse direction of the first direction may be the same or different, which are not limited here.

In a second manner, as shown in FIG. 3, the light output surfaces 120 of the LED illuminants 12 at odd number positions are deflectively set at an acute angle with respect to the reverse direction of the first direction, and the light output surfaces 120 of the LED illuminants 12 at even number positions are deflectively set at an acute angle with respect to the first direction.

Here, the deflection angles of the light output surfaces 120 of the LED illuminants 12 at odd number positions with respect to the reverse direction of the first direction may be the same or different. Likewise, the light output surfaces 120 of the LED illuminants 12 at even number positions with respect to the first direction may be the same or different, which are not limited here.

Further, the interval between the light-emitting center of an LED illuminant 12 whose light output surface 120 is deflectively set at an acute angle with respect to the first direction and the light-emitting center of an adjacent LED illuminant 12 along the first direction whose light output surface 120 is deflectively set at an acute angle with respect to the reverse direction of the first direction is a first interval $Y_1$.

Correspondingly, the interval between the light-emitting center of an LED illuminant 12 whose light output surface 120 is deflectively set at an acute angle with respect to the first direction and the light-emitting center of another adjacent LED illuminant 12 along the reverse direction of the first direction whose light output surface 120 is deflectively set at an acute angle with respect to the reverse direction of the first direction is a second interval $Y_2$.

In the exemplary embodiment, the first interval $Y_1$ is greater than the second interval $Y_2$.

It shall be noted that the LED illuminant 12 whose light output surface 120 is deflectively set at an acute angle with respect to the first direction and the adjacent LED illuminant 12 along the first direction whose light output surface 120 is deflectively set at an acute angle with respect to the reverse direction of the first direction are namely a pair of LED illuminants 12 deflected towards each other.

Correspondingly, the LED illuminant 12 whose light output surface 120 is deflectively set at an acute angle with respect to the first direction and the other adjacent LED illuminant 12 along the reverse direction of the first direction whose light output surface 120 is deflectively set at an acute angle with respect to the reverse direction of the first direction are namely a pair of LED illuminants 12 deflected away from each other.

On such basis, since the interval (i.e. the first interval $Y_1$) between the light-emitting centers of the two adjacent LED illuminants 12 deflected towards each other is larger such that the area of the region of bright spots with stronger illumination intensity is increased, and at the same time, the interval (i.e. the second interval $Y_2$) between the light-emitting centers of the two adjacent LED illuminants 12 deflected away from each other is smaller such that the area of the region of dark spots with weaker illumination intensity is decreased, the hot spot phenomenon resulted from inherent limitation of the light-emitting angle of LED illuminants can be effectively reduced or eliminated.

Specifically, regarding the above first manner, as shown in FIG. 2, the interval between the light-emitting center of any LED illuminant 12 at an odd number position and the light-emitting center of an adjacent LED illuminant 12 at an even number position along the first direction is $X_1$ (i.e. the first interval $Y_1$), and the interval between the light-emitting center of any LED illuminant 12 at an even number position and the light-emitting center of an adjacent LED illuminant 12 at an odd number position along the first direction is $X_2$ (i.e. the second interval $Y_2$), wherein the interval $X_1$ is greater than the interval $X_2$.

Regarding the above second manner, as shown in FIG. 3, the interval between the light-emitting center of any LED illuminant 12 at an odd number position and the light-emitting center of an adjacent LED illuminant 12 at an even number position along the first direction is $X_3$ (i.e. the second interval $Y_2$), and the interval between the light-emitting center of any LED illuminant 12 at an even number position and the light-emitting center of an adjacent LED illuminant 12 at an odd number position along the first direction is $X_4$ (i.e. the first interval $Y_1$), wherein the interval $X_4$ is greater than the interval $X_3$.

On such basis, in order to make light emitted from the light output surfaces 120 distributed more homogeneously, the light-emitting angle of each LED illuminant 12 is $2\alpha$, and the acute angles are all $\beta$ (i.e. the deflection angles of the light output surface 120 of any LED illuminant 12 at an odd number position and the deflection angles of the light output surface 120 of any LED illuminant 12 at an even number position are both $\beta$).

In the exemplary embodiment, $2\alpha > 90°$; $\beta < \alpha$, and $0° < \beta \leq (90° - \alpha)$.

The embodiments of the present invention further provide a backlight module. As shown in FIGS. 4, 5 and 7-9, the backlight module includes a light guide plate 20 and an LED light strip 10 located on at least one side of the light guide plate 20, wherein the LED light strip is the LED light strip 10 according to any one of the above embodiments. The light guide plate 20 includes a nonplanar light input surface 201, with the light input surface 201 contacting the light output surfaces 120 of the plurality of LED illuminants (not shown in the figures).

On the LED light strip 10, the light output surface 120 of at least one LED illuminant 12 is deflectively set at an acute angle with respect to the first direction or the reverse direction of the first direction. In order to sufficiently guide the light emitted from the light output surface 120 into the light guide plate 20, the light input surface 201 of the light guide plate 20 is nonplanar such that the light input surface 201 keeps in contact with the light output surfaces 120 of the plurality of LED illuminants 12.

Figure 9:
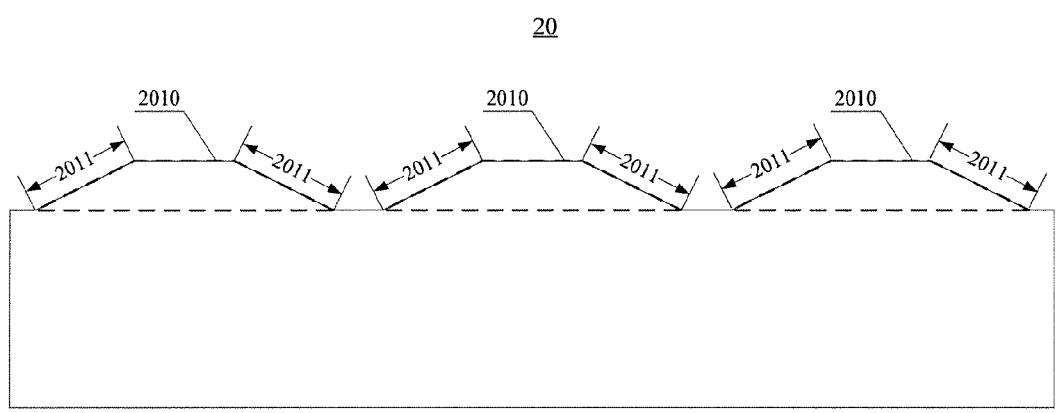
FIG. 9 is a local structural diagram of a light guide plate in a backlight module provided in the embodiments of the present invention.

Further, in order to make the nonplanar light input surface 201 better contact and cooperate with the light output surfaces 120 of the plurality of LED illuminants 12, as shown in FIG. 9, the light input surface 201 includes a plurality of protrusions 2010 including two slopes 2011 set oppositely, with the slopes 2011 contacting the light output surfaces 120 (not shown) of the plurality of LED illuminants 12 (not shown). A center-to-center interval between two slopes 2011 set oppositely in any protrusion 2010 is greater than that of two slopes 2011 in two protrusions 2010 close to each other.

Further, the interval between the light-emitting center of an LED illuminant 12 whose light output surface 120 is deflectively set at an acute angle with respect to the first direction and the light-emitting center of an adjacent LED illuminant 12 along the first direction whose light output surface 120 is deflectively set at an acute angle with respect to the reverse direction of the first direction is a first interval $Y_1$.

Correspondingly, the interval between the light-emitting center of an LED illuminant 12 whose light output surface 120 is deflectively set at an acute angle with respect to the first direction and the light-emitting center of another adjacent LED illuminant 12 along the reverse direction of the first direction whose light output surface 120 is deflectively set at an acute angle with respect to the reverse direction of the first direction is a second interval $Y_2$.

In the exemplary embodiment, the first interval $Y_1$ is greater than the second interval $Y_2$.

On such basis, the light guide plate 20 further includes two opposite side faces 202 perpendicular to the light input surface 201. The light input surface 201 of the light guide plate has a width of L. The number of the plurality of LED illuminants 12 is n, wherein n is a positive integer greater than or equal to 2. An average interval $X_0$ between the light-emitting centers of two adjacent LED illuminants 12 is L/n, and $Y_1 > X_0 > Y_2$.

In the case that n is an odd number, the sum of the intervals from the light-emitting centers of the LED illuminants 12 located at two ends of the circuit board 11 to the extension line directions of closer side faces 202 is $(Y_1 + Y_2)/2$.

In the case that n is an even number, the sum of the intervals from the light-emitting centers of the LED illuminants 12 located at two ends of the circuit board 11 to the extension line directions of closer side faces 202 is $Y_2$.

Specifically, it can be known from the above descriptions that the plurality of LED illuminants 12 can be arranged on the upper surface 110 of the circuit board, for example, in the following two manners.

Figure 4:
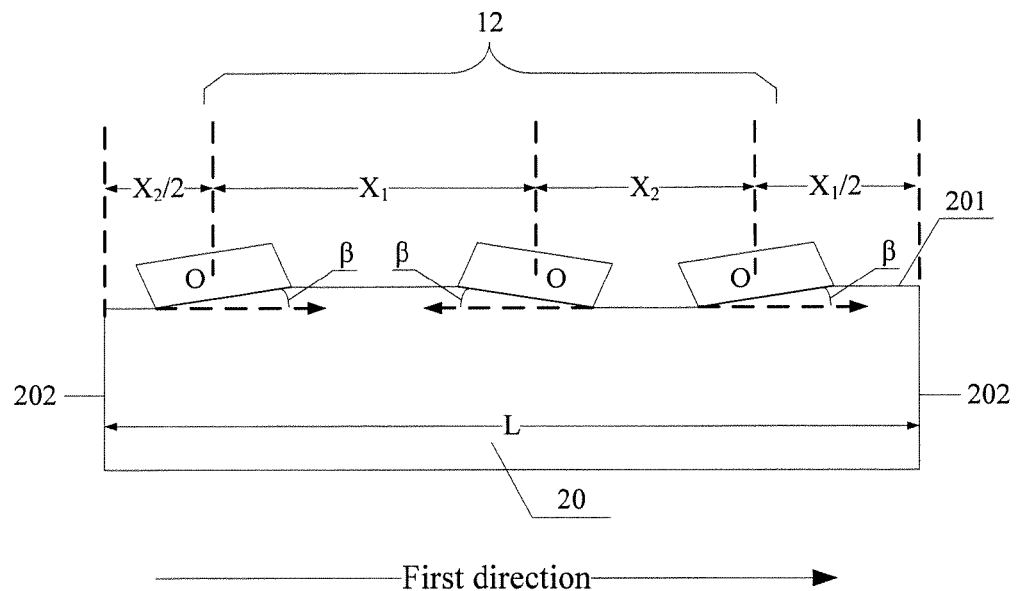
FIG. 4 is a structural diagram of a backlight module provided in the embodiments of the present invention.
Figure 5:
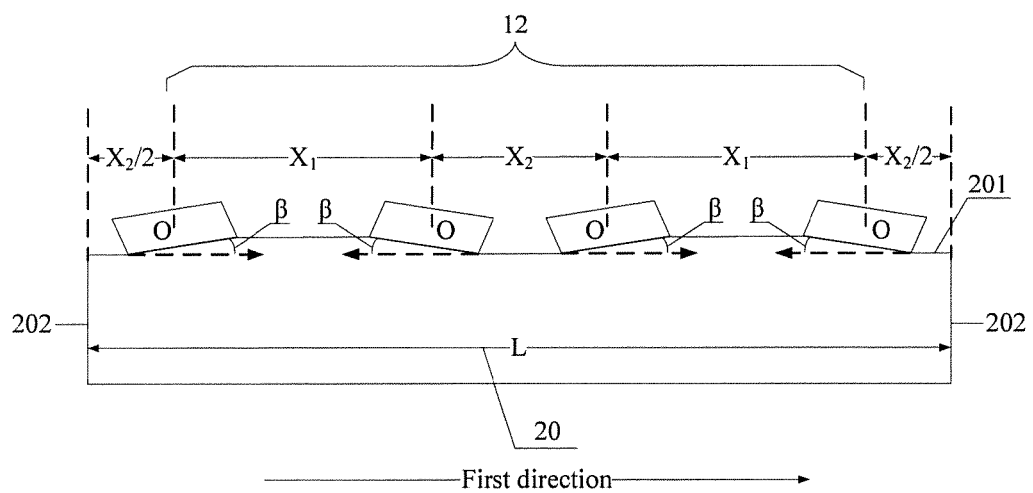
FIG. 5 is a structural diagram of another backlight module provided in the embodiments of the present invention.

In a first manner: as shown in FIGS. 2, 4 and 5, the light output surfaces 120 of the LED illuminants 12 at odd number positions are deflectively set at an acute angle with respect to the first direction, and the light output surfaces 120 of the LED illuminants 12 at even number positions are deflectively set at an acute angle with respect to the reverse direction of the first direction.

The interval between the light-emitting centers of the two adjacent LED illuminants 12 deflected towards each other is larger than the interval between the light-emitting centers of the two adjacent LED illuminants 12 deflected away from each other.

On such basis, since the interval between the light-emitting centers of the two adjacent LED illuminants 12 deflected towards each other is larger such that the area of the region of bright spots with stronger illumination intensity is increased. At the same time, the interval between the light-emitting centers of the two adjacent LED illuminants 12 deflected away from each other is smaller such that the area of the region of dark spots with weaker illumination intensity is decreased, the hot spot phenomenon resulting from inherent limitation of the light-emitting angle of an LED illuminants per se can be effectively reduced or eliminated, thereby improving the integral optical quality of the backlight module.

Further, in order to make light emitted from the light output surfaces 120 distributed more homogeneously, the light-emitting angle of each LED illuminant 12 is $2\alpha$, and the acute angles are all $\beta$ (i.e. the deflection angles of the light output surface 120 of any LED illuminant 12 at an odd number position and the light output surface 120 of any LED illuminant 12 at an even number position are both $\beta$).

In the exemplary embodiment, $2\alpha > 90°$; $\beta < \alpha$, and $0° < \beta \leq (90° - \alpha)$.

On such basis, for the purpose of simplifying the manner of arrangement of the plurality of LED illuminants 12 while making light emitted from the light output surfaces 120 of the plurality of LED illuminants 12 more homogeneous, advantageously, as shown in FIGS. 4 and 5, the interval between the light-emitting center of any LED illuminant 12 at an odd number position and the light-emitting center of an adjacent LED illuminant 12 at an even number position along the first direction is $X_1$ (i.e. the first interval $Y_1$), and the interval between the light-emitting center of any LED illuminant 12 at an even number position and the light-emitting center of an adjacent LED illuminant 12 at an odd number position along the first direction is $X_2$ (i.e. the second interval $Y_2$), with the interval $X_1$ being greater than the interval $X_2$.

In the exemplary embodiment, an average interval $X_0$ between the light-emitting centers of two adjacent LED illuminants 12 is L/n, and $X_1 > X_0 > X_2$.

As shown in FIG. 4, in the case that n is an odd number, the sum of the intervals from the light-emitting centers of the LED illuminants 12 located at two ends of the circuit board 11 to the extension line directions of closer side faces 202 is $(X_1+X_2)/2$.

In an exemplary embodiment, for the purpose of further simplifying the manner of arrangement of the plurality of LED illuminants 12, the intervals from the light-emitting centers of the LED illuminants 12 located at two ends of the circuit board 11 to the extension line directions of closer side faces 202 are $X_1/2$ and $X_2/2$, respectively.

Wherein, along the first direction, when the interval from the light-emitting center of the first LED illuminant 12 to the extension line direction of closer side face 202 is $X_2/2$, the interval from the light-emitting center of the last LED illuminant 12 to the extension line direction of closer side face 202 is $X_1/2$. Likewise, when the interval from the light-emitting center of the first LED illuminant 12 to the extension line direction of closer side face 202 is $X_1/2$, the interval from the light-emitting center of the last LED illuminant 12 to the extension line direction of closer side face 202 is $X_2/2$.

In the exemplary embodiment shown in FIG. 5, in the case that n is an even number, the sum of the intervals from the light-emitting centers of the LED illuminants 12 located at two ends of the circuit board 11 to the extension line directions of closer side faces 202 is $X_2$.

Here, for the purpose of further simplifying the manner of arrangement of the plurality of LED illuminants 12, the intervals from the light-emitting centers of the LED illuminants 12 located at two ends of the circuit board 11 to the extension line directions of closer side faces 202 are both $X_2/2$.

Regarding the first arrangement manner, taking n being an even number as an example, a specific embodiment is provided as follows for inferring in detail the effect of solving the hot spot phenomenon resulted from inherent limitation of the light-emitting angle of the LED illuminant 12 using the LED light strip 10.

As shown in FIG. 5, the interval between the light-emitting center of any LED illuminant 12 at an odd number position and the light-emitting center of an adjacent LED illuminant 12 at an even number position along the first direction is $X_1$, and the interval between the light-emitting center of any LED illuminant 12 at an even number position and the light-emitting center of an adjacent LED illuminant 12 at an odd number position along the first direction is $X_2$. The light input surface 201 of the light guide plate 20 has a width of L. In the exemplary embodiment, an average interval $X_0$ between the light-emitting centers of two adjacent LED illuminants 12 is L/n, and $X_1 > X_0 > X_2$.

From this it can be known that the average interval $X_0$ between the light-emitting centers of two adjacent LED illuminants 12 is $X_0 = L/n = (X_1 + X_2)/2$, hence the following equation can be obtained:

$$X_1 + X_2 = 2 \cdot \frac{L}{n},$$  Equation (1-1).

Figure 6:
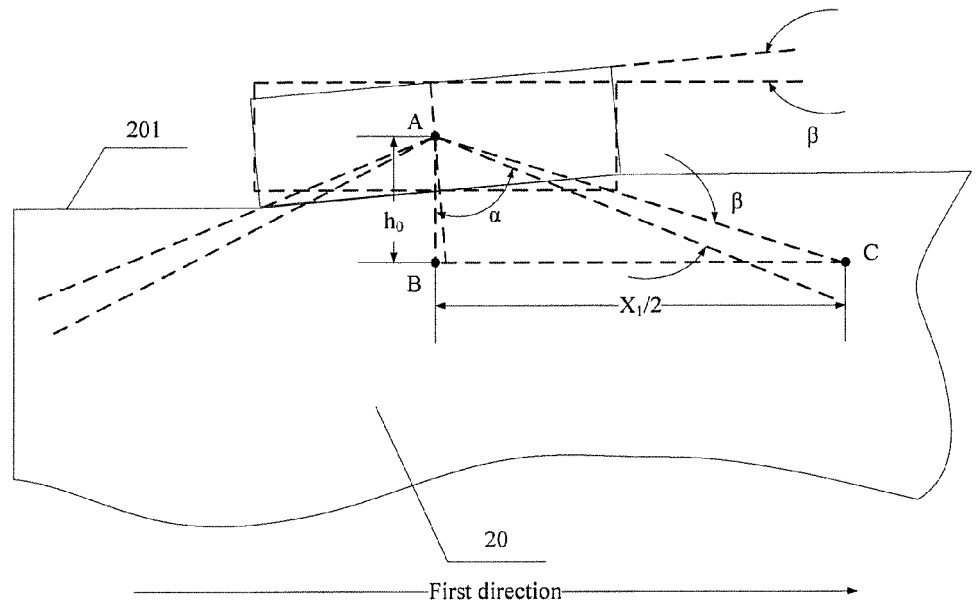
FIG. 6(*a*) is an amplified diagram of a part in FIG. 5.
Figure 6:
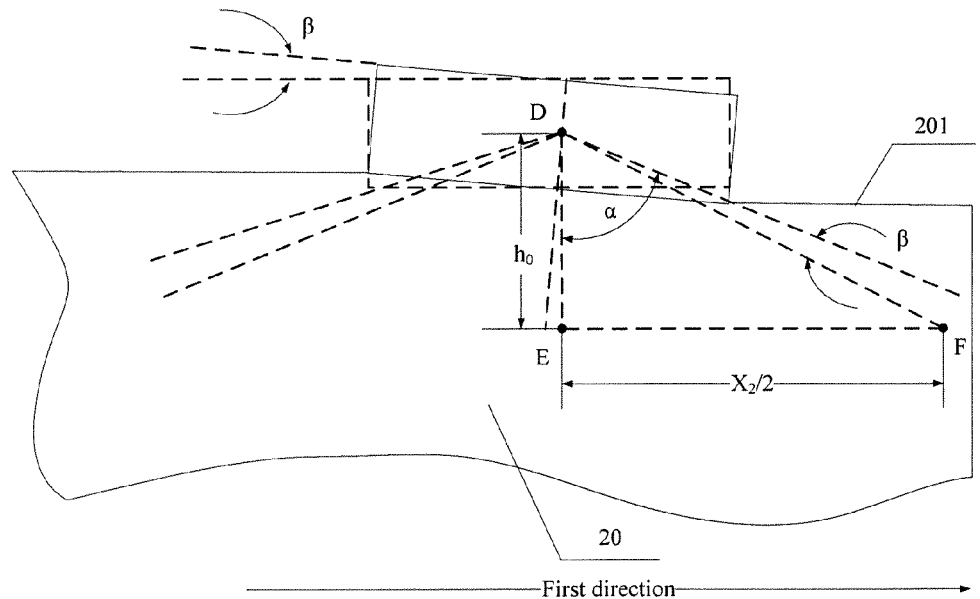
Figure 6:
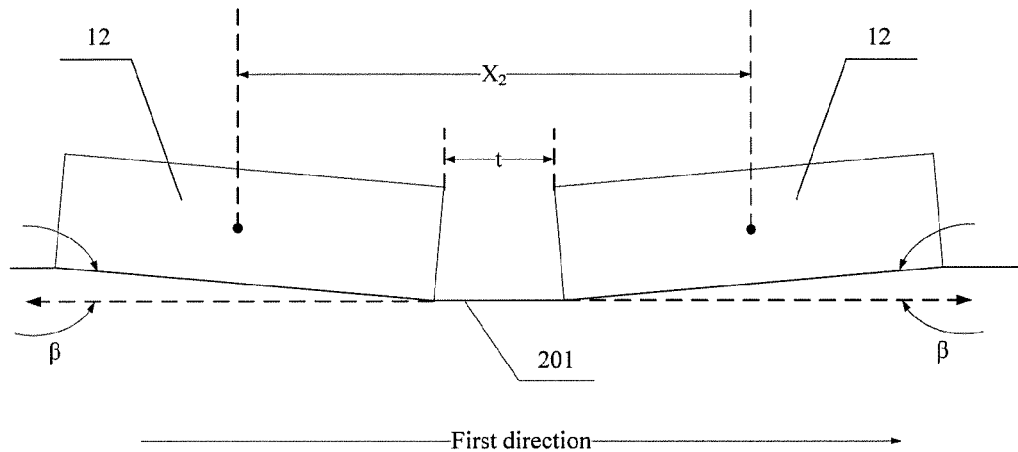

As shown in FIG. 6(a), since the light output surface 120 of any LED illuminant 12 located at an odd number position is deflectively set at an acute angle β with respect to the first direction, the range of light emitted from the light output surface 120 is also deflected accordingly by the angle β, thus in the triangle ABC, the following equation can be obtained:

$$\tan(\alpha + \beta) = \frac{X_2}{2 \cdot h_0},$$  Equation (1-2);

wherein $h_0$ is the distance of the apparent phenomenon of alternation of brightness and darkness after the LED light strip 10 emits light.

Likewise, as shown in FIG. 6(b), since the light output surface 120 of any LED illuminant 12 located at an even number position is deflectively set at an acute angle β with respect to the reverse direction of the first direction, light emitted from the light output surface 120 is also deflected accordingly by the angle β, thus in the triangle DEF, the following equation can be obtained:

$$\tan(\alpha - \beta) = \frac{X_2}{2 \cdot h_0},$$  Equation (1-3).

Therefore, the following equations can be derived from Equation (1-2) and Equation (1-3):

i. $X_1 = 2 \cdot h_0 \cdot \tan(\alpha + \beta),$  Equation (1-4);

ii. $X_2 = 2 \cdot h_0 \cdot \tan(\alpha - \beta),$  Equation (1-5).

The following equation can be derived from Equation (1-4) and Equation (1-5) in combination with Equation (1-1):

$$h_0 = \frac{X_1}{2 \cdot \tan(\alpha + \beta)} = \frac{X_2}{2 \cdot \tan(\alpha - \beta)},$$  Equation (1-6)

Further, the Equation (1-6) can be equivalently transformed and the following equation is derived:

$$X_2 = X_1 \cdot \frac{\tan(\alpha + \beta)}{\tan(\alpha - \beta)},$$  Equation (1-7)

Further, the following equation can be derived from Equation (1-7) in combination with Equation (1-1):

$$X_1 = \frac{2 \cdot L \cdot \tan(\alpha + \beta)}{n \cdot [\tan(\alpha + \beta) + \tan(\alpha - \beta)]}.$$  Equation (1-8)

The following equation can be derived from Equation (1-8) in combination with Equation (1-4) or Equation (1-5):

$$h_0 = \frac{L}{2 \cdot n \cdot [\tan(\alpha + \beta) + \tan(\alpha - \beta)]}.$$  Equation (1-9)

Figure 1:
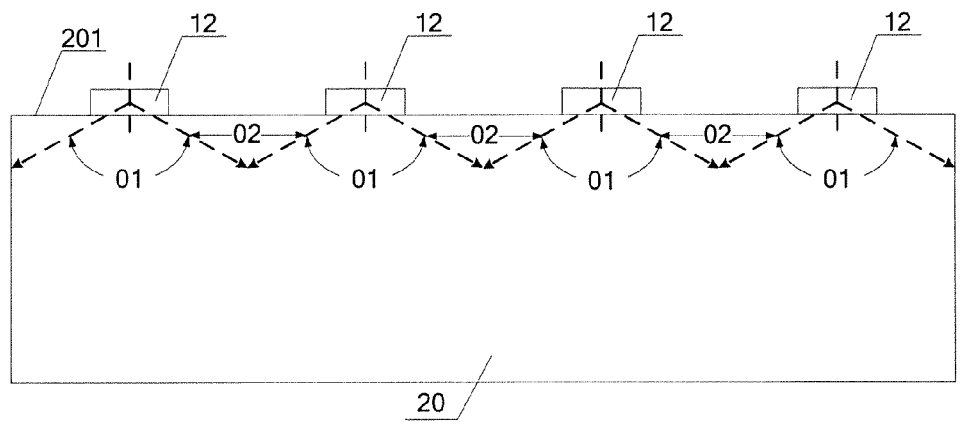
FIG. 1(*a*) is a structural top view of a backlight module provided in the prior art.
Figure 1:
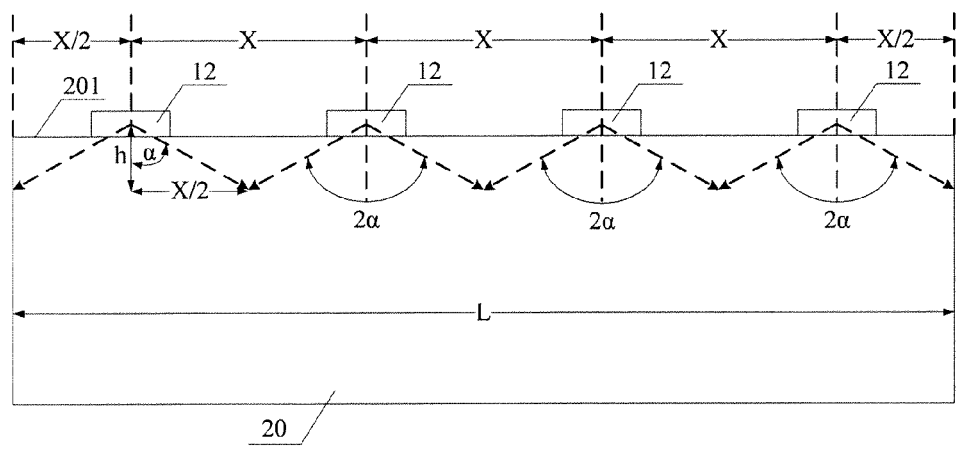

Upon comparison, as shown in FIG. 1(b), in the prior art, the LED illuminants 12 are usually arranged at equal intervals and the light output surfaces of all the LED illuminants 12 are arranged along a straight line, therefore, the interval X between two adjacent LED illuminants 12 is L/n, wherein L is the width of the light input surface 201 of the light guide plate 20 in cooperation with the LED light strip provided in the prior art, in which the LED light strip is used in a backlight module. However, the distance in the apparent phenomenon of alternation of brightness and darkness after the LED light strip provided in the prior art emits light is $X/(2\cdot\tan\alpha)$. Thus the following equation can be obtained:

$$h = \frac{L}{2\cdot n\cdot\tan\alpha}. \quad\text{Equation (1-10)}$$

However, in the LED light strip 10 provided in the embodiments of the present invention, $2\alpha>90°$; $\beta<\alpha$, and $0°<\beta\le(90°-\alpha)$. Thus the following equation can be obtained:

$$\tan(\alpha+\beta)+\tan(\alpha-\beta)>\tan\alpha;$$

thereby arriving at the following conclusion:

a. $h_0<h,$      Conclusion (1-1).

Conclusion (1-1) indicates that, as compared with the prior art, without changing the number of the LED illuminants 12, the distance of the hot spot region with apparent brightness and darkness is reduced by using the LED light strip 10 provided in the embodiments of the present invention. Namely, when the LED light strip 10 contacts the light guide plate 20, the area of the generated hot spot region is reduced. Moreover, since the distance of the hot spot region with apparent brightness and darkness generated by the LED light strip 10 is reduced, the area of the view area (VA) in the backlight module can be increased, and the frame width of the backlight module used in a display device can also be decreased, thereby optimizing the display quality.

On such basis, the function $f(\beta)=\tan(\alpha+\beta)+\tan(\alpha-\beta)$ is set. The following equation can be further obtained from the induction equation of the tangent function:

$$f(\beta) = 2\cdot\tan\alpha\frac{1+(\tan\beta)^2}{1-(\tan\alpha\cdot\tan\beta)^2}$$

Since the angle of $2\alpha$ is a fixed parameter for the given LED illuminant 12, i.e. $\tan\alpha$ is a constant, while $2\alpha>90°$, $\beta<\alpha$, and $0°<\beta\le(90°-\alpha)$. It can be obtained that $f(\beta)$ is an increasing function with respect to the variant $\beta$ by performing derivation of the function $f(\beta)$ with respect to $\beta$. Therefore, the following conclusion can be obtained by combining Equation (1-9): $h_0$ is a decreasing function with respect to the variant $\beta$, Conclusion (1-2).

Further, the following equation can be obtained from Equation (1-7) and Equation (1-9):

$$X_2 = \frac{2\cdot L\cdot\tan(\alpha-\beta)}{n\cdot[\tan(\alpha+\beta)+\tan(\alpha-\beta)]}; \quad\text{Equation (1-11)}$$

the following equation can be obtained by equivalently transforming Equation (1-11):

$$X_2 = \frac{2\cdot L\cdot[\tan(\alpha-\beta)+\tan(\alpha+\beta)-\tan(\alpha+\beta)]}{n\cdot[\tan(\alpha+\beta)+\tan(\alpha-\beta)]}$$
$$= \frac{2\cdot L}{n}\left[1-\frac{\tan(\alpha+\beta)}{f(\beta)}\right]$$

thereby arriving at the following conclusion: $X_2$ is a decreasing function with respect to the variant $\beta$, Conclusion (1-3).

Further, the following conclusion can be obtained by combining Conclusion (1-2) and Conclusion (1-3): the function $h_0(X_2)$ is an increasing function with respect to the variant $X_2$, Conclusion (1-4).

As can be known from Conclusion (1-4), the value of $h_0$ also decreases accordingly with the decrease in $X_2$. Namely, the smaller the distance of the hot spot region with apparent brightness and darkness as generated by the LED light strip 10 is, the better the effect of solving hot spot in the backlight module will be.

Therefore, as shown in FIG. 6(c), with respect to the light guide plate 20, when the interval t between an LED illuminant 12 located at an even number position and one side of an adjacent LED illuminant 12 located at an odd number position along the first direction (which side being close to the light input surface of the light guide plate) is 0, the value of the interval $X_2$ is smallest, and the effect of solving the hot spot phenomenon in the backlight module is optimal.

Figure 7:
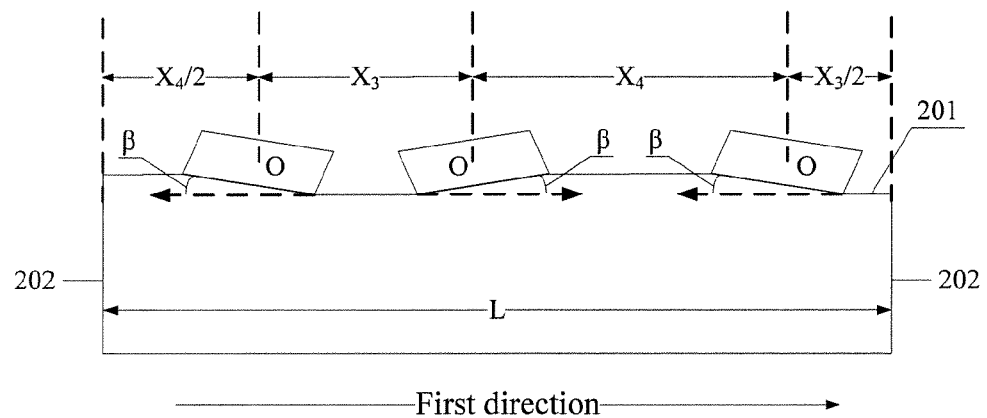
FIG. 7 is a structural diagram of a further backlight module provided in the embodiments of the present invention.
Figure 8:
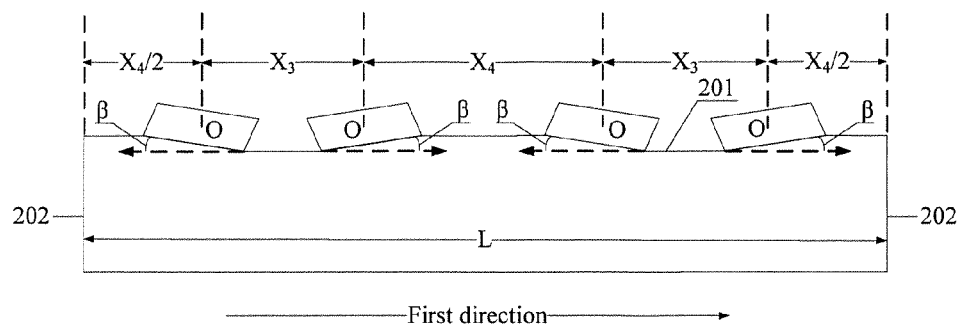
FIG. 8 is a structural diagram of a further backlight module provided in the embodiments of the present invention.

In the second manner: as shown in FIGS. 3, 7 and 8, the light output surfaces 120 of the LED illuminants 12 at odd number positions are deflectively set at an acute angle with respect to the reverse direction of the first direction, and the light output surfaces 120 of the LED illuminants 12 at even number positions are deflectively set at an acute angle with respect to the first direction.

Wherein, the interval between the light-emitting centers of the two adjacent LED illuminants 12 deflected towards each other is larger than the interval between the light-emitting centers of the two adjacent LED illuminants 12 deflected away from each other.

In this way, since the interval between the light-emitting centers of the two adjacent LED illuminants 12 deflected towards each other is larger such that the area of the region of bright spots with stronger illumination intensity is increased, and at the same time, the interval between the light-emitting centers of the two adjacent LED illuminants 12 deflected away from each other is smaller such that the area of the region of dark spots with weaker illumination intensity is decreased, the hot spot phenomenon resulted from limitation of the light-emitting angle of an LED illuminants per se can be effectively reduced or eliminated, thereby improving the integral optical quality of the backlight module.

Further, in order to make light emitted from the light output surfaces 120 distributed more homogeneously, the light-emitting angle of each LED illuminant 12 is $2\alpha$, and the acute angles are all $\beta$ (i.e. the deflection angles of the light output surface 120 of any LED illuminant 12 at an odd number position and the light output surface 120 of any LED illuminant 12 at an even number position are both $\beta$).

In the exemplary embodiment, $2\alpha>90°$; $\beta<\alpha$, and $0°<\beta\le(90°-\alpha)$.

On such basis, for the purpose of simplifying the manner of arrangement of the plurality of LED illuminants 12 while making light emitted from the light output surfaces 120 of the plurality of LED illuminants 12 more homogeneous, advantageously, as shown in FIGS. 7 and 8, the interval between the light-emitting center of any LED illuminant 12 at an odd number position and the light-emitting center of an adjacent LED illuminant 12 at an even number position along the first direction is $X_3$ (i.e. the second interval $Y_2$), and the interval between the light-emitting center of any LED illuminant 12 at an even number position and the light-emitting center of an adjacent LED illuminant 12 at an odd number position along the first direction is $X_4$ (i.e. the first interval $Y_1$), with the interval $X_4$ being greater than the interval $X_3$.

On such basis, an average interval $X_0$ between the light-emitting centers of two adjacent LED illuminants 12 is L/n, and $X_4 > X_0 > X_3$.

In the exemplary embodiment shown in FIG. 7, in the case that n is an odd number, the sum of the intervals from the light-emitting centers of the LED illuminants 12 located at two ends of the circuit board 11 to the extension line directions of closer side faces 202 is $(X_3+X_4)/2$.

Here, for the purpose of further simplifying the manner of arrangement of the plurality of LED illuminants 12, the intervals from the light-emitting centers of the LED illuminants 12 located at two ends of the circuit board 11 to the extension line directions of closer side faces 202 are $X_3/2$ and $X_4/2$, respectively.

Wherein, along the first direction, when the interval from the light-emitting center of the first LED illuminant 12 to the extension line direction of closer side face 202 is $X_4/2$, the interval from the light-emitting center of the last LED illuminant 12 to the extension line direction of closer side face 202 is $X_3/2$. Likewise, when the interval from the light-emitting center of the first LED illuminant 12 to the extension line direction of closer side face 202 is $X_3/2$, the interval from the light-emitting center of the last LED illuminant 12 to the extension line direction of closer side face 202 is $X_4/2$.

As shown in FIG. 8, in the case that n is an even number, the sum of the intervals from the light-emitting centers of the LED illuminants 12 located at two ends of the circuit board 11 to the extension line directions of closer side faces 202 is $X_4$.

Here, for the purpose of further simplifying the manner of arrangement of the plurality of LED illuminants 12, the intervals from the light-emitting centers of the LED illuminants 12 located at two ends of the circuit board 11 to the extension line directions of closer side faces 202 are both $X_4/2$.

The specific derivation process of the effect of solving the hot spot phenomenon resulted from limitation of the light-emitting angle of the LED illuminant per se by using the above second manner may refer to the above first manner, which will not be repeated here.

The embodiments of the present invention further provide a display device including the LED light strip or the backlight module.

Since the backlight module employs the LED light strip 10 provided in the embodiments of the present invention, it is possible to effectively reduce or eliminate the hot spot phenomenon resulted from inherent limitation of the light-emitting angles of the plurality of LED illuminants 12 without increasing the number of the plurality of LED illuminants 12 in the LED light strip 10, thereby improving the integral optical quality of the backlight module as well as the picture quality of the display device.

It shall be noted that all the drawings for respective embodiments of the present invention are brief schematic views of the aforesaid LED light strip, backlight module and display device, only for describing the present solution clearly and representing the structures related to the inventive point. Other structures unrelated to the inventive aspects are existing structures and are not represented or only partly represented in the drawings.

The above embodiments are only specific embodiments of the present invention, but the protection scope of the present invention is not limited to this. Any skilled person familiar with this technical field can easily conceive of variations or substitutions within the technical scope revealed in the present invention, which shall be covered within the protection scope of the present invention. Therefore, the protection scope of the present invention shall be based on the protection scopes of the claims.

The invention claimed is:

1. An LED light strip comprising a circuit board and a plurality of LED illuminants each electrically connected to said circuit board and including a light-emitting center;
wherein:
said plurality of LED illuminants are arranged on an upper surface of said circuit board along a first direction, and intervals between the light-emitting center of one of the plurality of LED illuminants and the light-emitting centers of two adjacent LED illuminants are not equal;
said plurality of LED illuminants comprising light output surfaces perpendicular to said upper surface; and
the light output surface of at least one of the plurality of LED illuminants is deflectively set at an acute angle with respect to one of said first direction and a reverse direction of said first direction;
wherein the plurality of LED illuminants are arranged such that one of:
(a) the light output surfaces of the plurality of LED illuminants at odd number positions are deflectively set at an acute angle with respect to said first direction; and the light output surfaces of the plurality of LED illuminants at even number positions are deflectively set at an acute angle with respect to the reverse direction of said first direction; and
(b) the light output surfaces of the plurality of LED illuminants at odd number positions are deflectively set at an acute angle with respect to the reverse direction of said first direction, and the light output surfaces of the plurality of LED illuminants at even number positions are deflectively set at an acute angle with respect to said first direction.

2. The LED light strip according to claim 1, wherein:
the interval between the light-emitting center of an LED illuminant whose light output surface is deflectively set at an acute angle with respect to said first direction and the light-emitting center of an adjacent LED illuminant along said first direction whose light output surface is deflectively set at an acute angle with respect to the reverse direction of said first direction is a first interval $Y_1$; and
the interval between the light-emitting center of an LED illuminant whose light output surface is deflectively set at an acute angle with respect to said first direction and the light-emitting center of an adjacent LED illuminant along the reverse direction of said first direction whose light output surface is deflectively set at an acute angle with respect to the reverse direction of said first direction is a second interval $Y_2$;
wherein said first interval $Y_1$ is greater than said second interval $Y_2$.

3. The LED light strip according to claim 1, wherein a light-emitting angle of each LED illuminant is $2\alpha$, each of said acute angles are $\beta$, and wherein $2\alpha > 90°$; $\beta < \alpha$, and $0° < \beta \leq (90°-\alpha)$.

4. A backlight module, comprising a light guide plate and the LED light strip according to claim 1, located on at least one side of said light guide plate, wherein said light guide plate comprises a nonplanar light input surface, said light input surface contacts the light output surfaces of said plurality of LED illuminants.

5. A display device comprising the LED light strip according to claim 1.

6. The backlight module according to claim 4, wherein said light input surface comprises a plurality of protrusions comprising two slopes set oppositely, wherein said slopes contact the light output surfaces of said plurality of LED illuminants, wherein a center-to-center interval between two slopes set oppositely in any protrusion is greater than a center-to-center interval between two slopes close to each other in adjacent protrusions.

7. The backlight module according to claim 4, wherein:
an interval between the light-emitting center of an LED illuminant whose light output surface is deflectively set at an acute angle with respect to said first direction and the light-emitting center of an adjacent LED illuminant along said first direction whose light output surface is deflectively set at an acute angle with respect to the reverse direction of said first direction is a first interval $Y_1$; and
an interval between the light-emitting center of an LED illuminant whose light output surface is deflectively set at an acute angle with respect to said first direction and the light-emitting center of an adjacent LED illuminant along the reverse direction of said first direction whose light output surface is deflectively set at an acute angle with respect to the reverse direction of said first direction is a second interval $Y_2$;
wherein said first interval $Y_1$ is greater than said second interval $Y_2$.

8. A display device comprising the backlight module according to claim 4.

9. The backlight module according to claim 7, wherein:
said light guide plate further comprises two opposite side faces perpendicular to said light input surface, defining a width L of the light input surface of said light guide plate;
a number of said plurality of LED illuminants is n, n being a positive integer greater than or equal to 2;
an average interval $X_0$ between the light-emitting centers of two adjacent LED illuminants is L/n; and $$Y_1 > X_0 > Y_2;$$

wherein, in the case that n is an odd number, the sum of the intervals from the light-emitting centers of an endmost LED illuminant located at each end of said circuit board to the extension line in the direction of the closer side face is $(Y_1+Y_2)/2$; and
in the case that n is an even number, the sum of the intervals from the light-emitting centers of the endmost LED illuminant located at each end of said circuit board to the extension line in the direction of the closer side face is $Y_2$.

10. The backlight module according to claim 7, wherein with respect to said light input surface of said light guide plate, two adjacent LED illuminants whose light-emitting centers have an interval of said second interval $Y_2$ contact each other.

\* \* \* \* \*